(12) United States Patent
Schirtzinger et al.

(10) Patent No.: US 9,702,260 B2
(45) Date of Patent: Jul. 11, 2017

(54) STATIONARY NON-ROTATING BRUSH SEALS

(71) Applicant: UNITED TECHNOLOGIES CORPORATION, Hartford, CT (US)

(72) Inventors: Gary A. Schirtzinger, Glastonbury, CT (US); George J. Kramer, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/882,244

(22) Filed: Oct. 13, 2015

(65) Prior Publication Data
US 2016/0032750 A1 Feb. 4, 2016

Related U.S. Application Data

(63) Continuation of application No. PCT/US2014/037997, filed on May 14, 2014.

(60) Provisional application No. 61/845,207, filed on Jul. 11, 2013.

(51) Int. Cl.
F16J 15/447 (2006.01)
F01D 11/00 (2006.01)
F01D 11/08 (2006.01)
F16J 15/3288 (2016.01)

(52) U.S. Cl.
CPC .......... *F01D 11/005* (2013.01); *F01D 11/001* (2013.01); *F01D 11/08* (2013.01); *F16J 15/3288* (2013.01); *F05D 2220/32* (2013.01); *F05D 2240/56* (2013.01)

(58) Field of Classification Search
CPC .......................... F16J 15/3284; F16J 15/3288
See application file for complete search history.

(56) References Cited

U.S. PATENT DOCUMENTS

| | | | |
|---|---|---|---|
| 3,917,150 A | | 11/1975 | Ferguson et al. |
| 4,202,554 A | * | 5/1980 | Snell .................... F16J 15/3288 277/355 |
| 4,457,515 A | * | 7/1984 | Eidschun ................. A46B 9/02 118/326 |
| 4,541,741 A | * | 9/1985 | Woodbridge ........... F16C 33/76 277/355 |

(Continued)

FOREIGN PATENT DOCUMENTS

EP 2065646 6/2009

OTHER PUBLICATIONS

International Preliminary Report on Patentability dated Jun. 11, 2015 in Application No. PCT/US2014/037997.

(Continued)

*Primary Examiner* — Gilbert Lee
(74) *Attorney, Agent, or Firm* — Snell & Wilmer, L.L.P.

(57) ABSTRACT

The present disclosure relates to an aircraft brush seal comprising a first brush seal member and a second brush seal member comprising a channel that receives a plurality of interwoven brush fibers. The interwoven brush fibers may be coupled to the first brush seal member and/or may extend into the second brush seal member. The interwoven brush fibers may not couple to the second brush seal member and/or may form an air seal. The air seal may be formed between a first air compartment and a second air compartment.

19 Claims, 4 Drawing Sheets

(56) References Cited

U.S. PATENT DOCUMENTS

| | | | |
|---|---|---|---|
| 4,730,876 A | | 3/1988 | Werner et al. |
| 4,781,388 A | | 11/1988 | Wohrl et al. |
| 5,029,875 A | * | 7/1991 | Spain ..................... F01D 11/00 |
| | | | 277/307 |
| 5,137,078 A | * | 8/1992 | Borowy ................ F28D 19/047 |
| | | | 165/9 |
| 5,400,586 A | | 3/1995 | Bagepalli et al. |
| 5,474,306 A | | 12/1995 | Bagepalli et al. |
| 5,752,805 A | | 5/1998 | Gail et al. |
| 5,927,721 A | * | 7/1999 | Schulze ............... F16J 15/3288 |
| | | | 277/355 |
| 6,042,119 A | | 3/2000 | Bagepalli et al. |
| 6,077,038 A | | 6/2000 | Gail et al. |
| 6,131,910 A | * | 10/2000 | Bagepalli ................ F01D 5/225 |
| | | | 277/355 |
| 6,390,476 B1 | * | 5/2002 | Tong ..................... F16J 15/442 |
| | | | 277/355 |
| 8,043,012 B2 | | 10/2011 | Rogall et al. |
| 2004/0180595 A1 | | 9/2004 | Arold-Gorham |
| 2006/0249910 A1 | | 11/2006 | Beichl et al. |
| 2008/0309017 A1 | | 12/2008 | Mattice |
| 2009/0072486 A1 | | 3/2009 | Datta |

OTHER PUBLICATIONS

International Search Report and Written Opinion dated Nov. 26, 2014 in Application No. PCT/US2014/037997.

\* cited by examiner

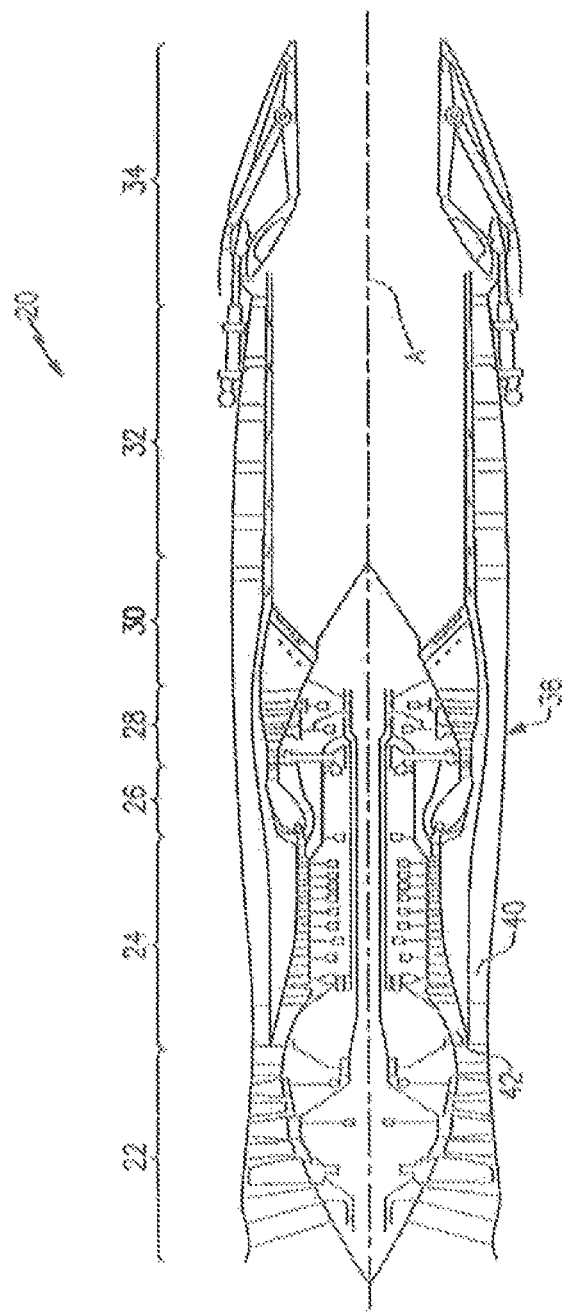

STATIONARY NON-ROTATING BRUSH SEALS

CROSS-REFERENCE TO RELATED APPLICATIONS

This application is a continuation of, claims priority to and the benefit of, PCT/US2014/037997 filed on May 14, 2014 and entitled "STATIONARY NON-ROTATING BRUSH SEALS," which claims priority from U.S. Provisional Application No. 61/845,207 filed on Jul. 11, 2013 and entitled "STATIONARY NON-ROTATING BRUSH SEALS." Both of the aforementioned applications are incorporated herein by reference in their entirety.

FIELD OF INVENTION

The present disclosure is related to a gas turbine engine, and more particularly, to a brush seal which may comprise an air seal between portions of a gas turbine engine.

BACKGROUND OF THE INVENTION

Gas turbine engines, such as those that power modern commercial and military aircraft, typically include a compressor to pressurize inflowing air, a combustor to burn a fuel in the presence of the pressurized air, and a turbine to extract energy from the resulting combustion gases.

The primary air flow in a gas turbine engine is through the compressor, combustor, and turbine. A cooler, secondary air flow, may be contained more external to the gas turbine engine and/or flowing through one or more shafter internal to the engine and/or one or more bearing compartments within the engine. In some cases, this secondary air flow may leak into the primary air flow. However, leakage between the secondary air flow and the primary air flow may be prevented or reduced by the use of one or more brush seals. In many turbine engines, this cooler, secondary air flow, may be contained in air compartments at a higher pressure than the air flowing through the compressor, combustor, or turbine.

Conventional systems have therefore utilized one or more brush seals having bristles, to limit uncontrolled secondary air flow into the compressor, combustor, and/or turbine. Conventional seals are often placed between rotating parts of a turbine, such as between rotating blade disks and stationary vane flanges. These seal systems have typically relied upon the rotation of one surface relative to another surface to force the bristles of a brush seal into sealing contact. For example, these systems have typically relied upon the pressure generated by a turbine stage set forward of an aft turbine stage to urge the brush seal bristles into sealing contact.

SUMMARY OF THE INVENTION

The present disclosure relates to an aircraft brush seal comprising a first brush seal member and a second brush seal member comprising a channel that receives a plurality of interwoven brush fibers. In various embodiments, the interwoven brush fibers may be coupled to the first brush seal member and/or may extend into the second brush seal member. In various embodiments, the interwoven brush fibers may not couple to the second brush seal member and/or may form an air seal. The air seal may be formed between a first air compartment and a second air compartment.

The present disclosure further relates to an aircraft brush seal comprising a first brush seal member and a second brush seal member comprising a channel that receives a plurality of brush fibers, wherein the second brush seal member may comprise a tapered portion. In various embodiments, the brush fibers may be interwoven and/or coupled to the first brush seal member. In addition, in various embodiments, the brush fibers may extend into the second brush seal member, such as a tapered portion of the second brush seal member. The brush fibers may or may not couple to the second brush seal member. The brush fibers may form an air seal between a first air compartment and a second air compartment.

The present disclosure further relates to an aircraft brush seal comprising a first brush seal member comprising a first channel that receives a plurality of brush fibers, a second brush seal member comprising a second channel that receives the plurality of brush fibers, and a central shaft about which the brush fibers may be wrapped. In various embodiments, the brush fibers may wrap about the central shaft to intersect at a junction. Further, in various embodiments, at least one of a plurality of spring forces may secure the brush fibers between the first brush seal member and the second brush seal member. The brush fibers may or may not couple to the first channel and/or the second channel. The brush fibers may form a seal between a first air compartment and a second air compartment.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

FIG. 1 illustrates a cross-sectional view of a conventional gas turbine engine, in accordance with various embodiments;

DETAILED DESCRIPTION

Figure 2A:
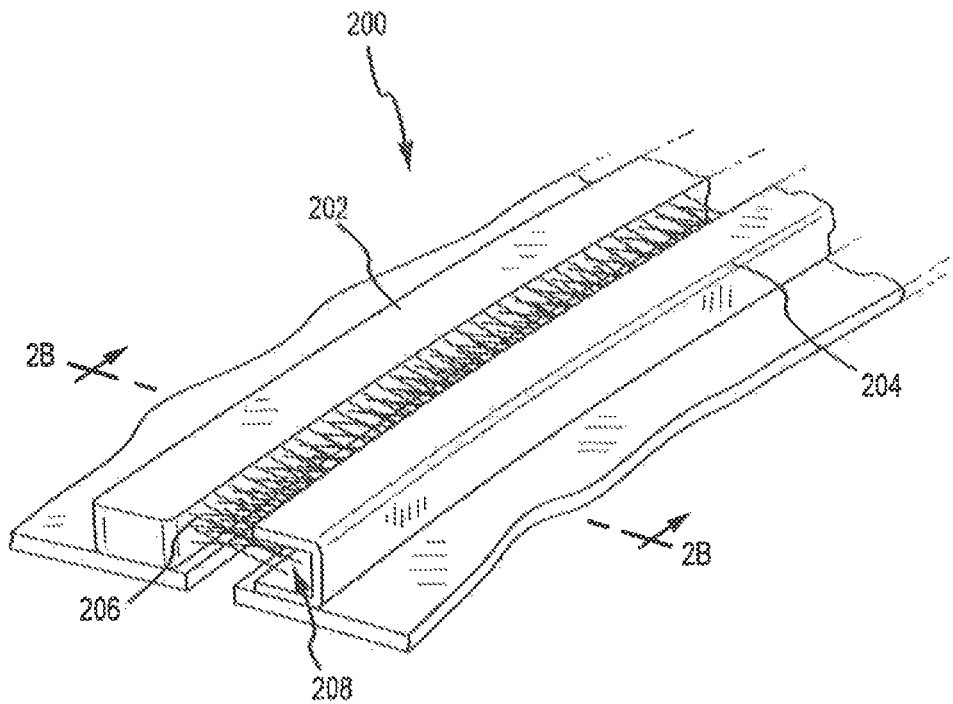
FIG. 2A illustrates a perspective view of a first brush seal, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Referring to FIG. 1, a gas turbine engine 20 is shown. In various embodiments, the gas turbine engine 20 comprises a two-spool low-bypass augmented turbofan. The turbofan generally incorporates a fan section 22, a compressor section 24, a combustor section 26, a turbine section 28, an augmenter section 30, an exhaust duct section 32, and a nozzle system 34, along a central longitudinal engine axis A. Although depicted as an augmented low bypass turbofan in the non-limiting embodiment of FIG. 1, it should be understood that the concepts described herein are applicable to other gas turbine engines including non-augmented engines, geared architecture engines, direct drive turbofans, turbojet, turboshaft, multi-stream variable cycle adaptive engines, and other engine architectures. Variable cycle gas turbine engines power aircraft over a range of operating conditions and may alter a bypass ratio during flight to achieve countervailing objectives, such as high specific thrust for high-energy maneuvers, optimization of fuel efficiency for cruise and loiter operational modes, etc.

An engine case structure 36 defines a generally annular secondary airflow path 40 around a core airflow path 42. Various case structures and modules may define the engine case structure 36 which defines an exoskeleton to support the rotational hardware.

Air that enters the fan section 22 is divided between a core primary air flow through the core air flow path 42 and a secondary air flow through a secondary air flow path 40. The core air flow passes through the combustor section 26, the turbine section 28, then the augmentor section 30 where fuel may be selectively injected and burned to generate additional thrust through the nozzle system 34. It should be appreciated that additional air flow streams such as a third stream air flow typical of variable cycle engine architectures may additionally be sourced from the fan section 22.

The secondary air flow may be utilized for multiple purposes including, for example, cooling and pressurization. The secondary air flow may be any air flow different from the core or primary air flow. The secondary air flow may ultimately be at least partially injected into the core air flow path 42 adjacent to the exhaust duct section 32 and the nozzle system 34.

The exhaust duct section 32 may be circular in cross-section, such in an axisymmetric augmented low bypass turbofan or may be non-axisymmetric in cross-section including, for example, a serpentine shape to block direct view to the turbine section 28. In addition to the various cross-sections and the various longitudinal shapes, the exhaust duct section 32 may terminate in a Convergent/Divergent ("C/D") nozzle system, a non-axisymmetric two-dimensional (2D) C/D vectorable nozzle system, a flattened slot nozzle of high aspect ratio or other nozzle arrangement.

In various embodiments, a compressor and/or turbine may comprise one or more compressor and/or turbine stages, respectively. For example, a turbine may comprise multiple sets of rotating blades and stationary vanes. Each set may comprise a turbine stage. Likewise, a compressor may comprise multiple sets of rotating blades and stationary vanes. Each set may comprise a compressor stage. Further, in various embodiments, a set of blades and/or vanes may be coupled to a circumference of a generally circular central disk. The blades may thus rotate with the disk as the disk rotates.

As the thermal environment surrounding each turbine or compressor stage varies during operation, the clearance area between the rotating turbine or compressor blade disk and one or more non-rotating components (such as one or more air compartments, one or more stationary vanes, a fan case enclosing the compressor and turbine, one or more blade outer air seals enclosing the compressor and/or turbine, and the like) may vary. Thus, for example, as one or more non-rotating components, such as one or more air compartments and/or one or more nozzle components experience a thermal gradient, each air compartment and/or nozzle component may experience motion or may shift relative to the one or more other air compartments as a result of the varying thermal environment. In addition, as described above the air maintained within the one or more air compartments may be contained at a pressure sufficient to induce leakage between the one or more air compartments and the turbine section 26 and/or the compressor section 22, particularly where the thermal environment of the turbine section 26 and/or compressor section 22 are in flux. Further still, as a nozzle section or flap moves (non-rotatingly) relative to another nozzle section or flap, the one or more brush seals disclosed herein may maintain a seal between nozzle sections.

Thus, one or more brush seals that comprise a plurality of bristles may be disposed between one or more air compartments. In various embodiments, a bristle may comprise any suitable material, including any metallic material and/or any metallic alloy. However, conventional brush seals have relied upon the rotation of one or more rotating components (e.g., compressor disks, turbine disks) to force brush bristles into sealing contact with one another. For example, many conventional systems utilize the air pressure generated by the rotation of the turbine to urge brush fibers to "lean" into contact with one another, thereby forming a seal. Thus, conventional systems may not form an adequate seal until the turbine and/or compressor have become operational and are rotating.

With reference to FIGS. 2A-4B, a brush seal may be formed, in various embodiments, in the absence of the pressure generated by a rotating compressor section 27 and/or turbine section 28. That is, with respect to FIGS. 2A-4B, brush seals are disclosed that are not dependent upon rotation of the compressor or turbine for seal integrity.

Figure 2B:
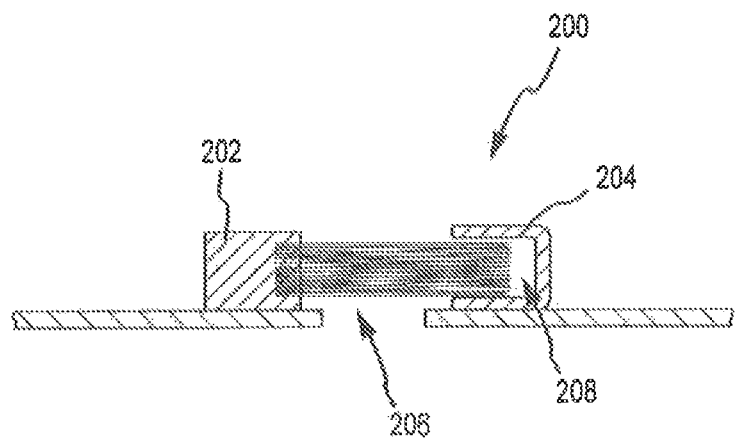
FIG. 2B a cross-sectional view of the first brush seal, in accordance with various embodiments.

Accordingly, with particular attention now to FIGS. 2A and 2B, a brush seal 200 is shown. In various embodiments, the brush seal 200 may comprise a first rail or brush seal member 202 and/or a second rail or brush seal member 204. A plurality of brush fibers 206 may be coupled to and extend from the first member 202. The second member 204 may comprise a channel 208 that receives the plurality of brush fibers 206. In various embodiments, the brush fibers 206 may extend into the channel 208. In various embodiments, the brush fibers 206 may or may not be coupled or bonded to either or both of the first member 202 and/or the second member 204.

Further, as shown, the brush fibers 206 may extend from the first member 202 in a crisscrossing, overlapping, or intersecting pattern. In other words, the brush fibers 206 may extend from the first member 202, such that one or more fibers 206 overlap or intersect with one or more other fibers 206. In this manner, airflow through the brush fibers 206 may be reduced or eliminated, and a brush seal 200 may be formed. In addition, as described above, little or no rotation of a turbine stage may be needed to form the brush seal 200, because the brush fibers may be, by design, enmeshed or interwoven with each other.

Figure 3A:
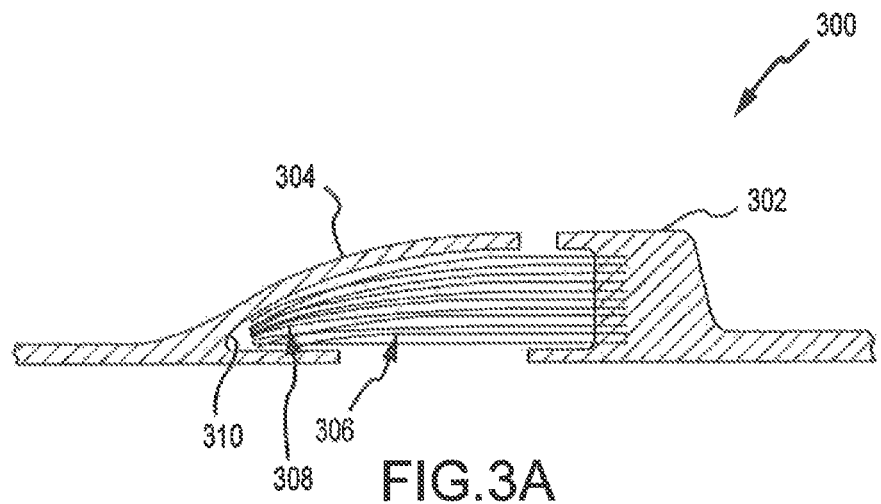
FIG. 3A illustrates a cross-sectional view of a second brush seal, in accordance with various embodiments.
Figure 3B:
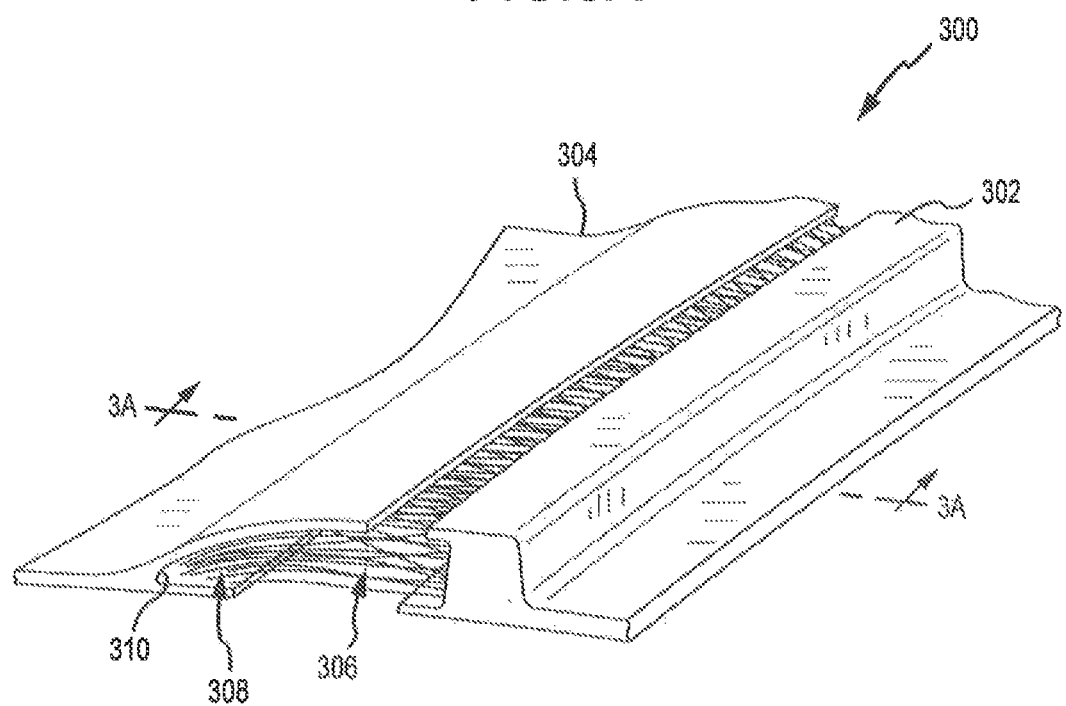
FIG. 3B illustrates a perspective view of a second brush seal, in accordance with various embodiments.

With reference to FIGS. 3A and 3B, a brush seal 300 is shown. In various embodiments, the brush seal may comprise a first rail or brush seal member 302 and/or a second rail or brush seal member 304. Similar to the brush seal 200 described above, a plurality of brush fibers 306 may be coupled to and extend from the first member 302. The second member 304 may comprise a channel 308 that receives the plurality of brush fibers 306. In various embodiments, the brush fibers 306 may extend into the channel 308, but may not be coupled or bonded to the channel 308. However, in various embodiments, the brush fibers 306 may or may not be coupled or bonded to either or both of the first member 302 and/or the second member 304.

Further, as shown, brush fibers 306 may extend from the first member 302 in a crisscrossing, overlapping, and/or intersecting pattern. In other words, brush fibers 306 may extend from the first member 302, such that one or more fibers 306 overlap or intersect with one or more other fibers 306.

Further still, in various embodiments, channel 308 may narrow or taper along a radial dimension. For example, channel 308 may, as shown, comprise a tapered portion 310, such that the plurality of brush fibers 306 are bunched or compacted as they extend into tapered portion 310. In this manner, airflow through brush fibers 306 may be reduced or eliminated, and brush seal 300 may be formed. Further, as second member 304 may comprise a tapered geometry, resistance to airflow over the surface of the second member 304 may be reduced. In addition, as described above, little or no rotation of a turbine stage may be needed to form the brush seal 300, because the brush fibers 306 may be, by design, enmeshed or interwoven with each other and/or bunched or compacted together at a tapered portion to further tighten the air seal formed by the brush seal 300.

Figure 4A:
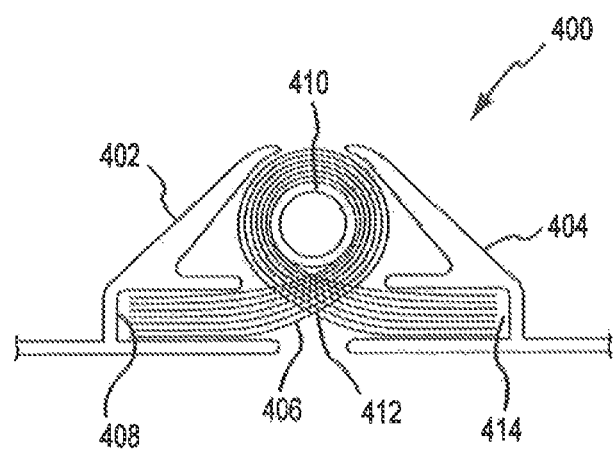
FIG. 4A illustrates a cross-sectional view of a third brush seal, in accordance with various embodiments.

Referring to FIG. 4A, a brush seal 400 is shown. In various embodiments, the brush seal 400 may comprise a first rail or brush seal member 402 and/or a second rail or brush seal member 404. In various embodiments, the first member 402 and/or the second member 404 may comprise an angled or slanted geometry, which may improve the aerodynamic properties of the first member 402 and/or the second member 404. A plurality of brush fibers 406 may extend from a first channel 408 formed in the first member 402. The brush fibers 406 may further, in various embodiments, wrap around a central shaft 410. A central shaft 410 may extend along an axis defined by the first member 402 and the second member 404. In addition, as the brush fibers 406 wrap about the central shaft 410, the brush fibers 406 may intersect, overlap, enmesh, or entangle at a junction 412, continuing thereafter to extend into a second channel 414 formed in the second member 404.

The central shaft 410 may comprise a hollow structure. However, in various embodiments, the central shaft 410 may comprise a solid structure. Further still, in various embodiments, the central shaft 410 may comprise a cylindrical structure. However, in various embodiments, the central shaft 410 may comprise any other suitable shape or cross-sectional profile, such as for example, an ovaloid or elliptical cross-sectional profile. In various embodiments, the central shaft 410 may be anchored to a portion of a gas turbine engine 20 by a flange or head on one end and/or a threaded nut, a rivet, a flared end, a collar, and the like on another end. A shaft may comprise a relatively linear cross-sectional profile as well as a variety of curved or curving cross-sectional profiles.

In various embodiments, the brush fibers 406 may not couple or bond to either of the first member 402 and/or the second member 404. However, in various embodiments, the brush fibers 406 may be coupled or bonded to either or both of the first member 402 and/or the second member 404.

Figure 4B:
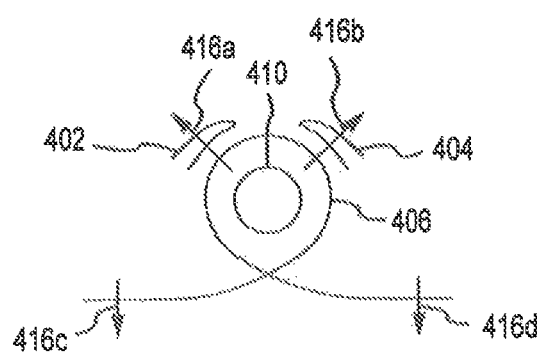
FIG. 4B illustrates a diagram of forces exerted by the third brush seal, in accordance with various embodiments.

Thus, as shown with respect to FIG. 4B, the brush fibers 406 may be held in place between the first member 402 and the second member 404 by a spring force exerted by the brush fibers 406. For purposes of illustration, this spring force is depicted, at FIG. 4B, as a plurality of vectors 416a, 416b, 416c, and/or 416d. However, as those of ordinary skill in the art will appreciate, the spring forces holding the brush fibers 406 in place may act along any of a variety of vectors.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the term adjacent may mean in close proximity to, but does not necessarily require contact. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft brush seal comprising:
a first brush seal member; and
a second brush seal member comprising a channel that receives a plurality of interwoven brush fibers, wherein the channel is tapered in a radial direction and configured to bunch a first tip of a first brush fiber from the plurality of brush fibers together with a second tip of a second brush fiber of the plurality of brush fibers in the channel.

2. The aircraft brush seal of claim 1, wherein the interwoven brush fibers are coupled to the first brush seal member.

3. The aircraft brush seal of claim 1, wherein the interwoven brush fibers extend into the second brush seal member.

4. The aircraft brush seal of claim 1, wherein the interwoven brush fibers do not couple to the second brush seal member.

5. The aircraft brush seal of claim 1, wherein the interwoven brush fibers form an air seal.

6. The aircraft brush seal of claim 1, wherein the brush fibers form a seal between a first air compartment and a second air compartment.

7. An aircraft brush seal comprising:
a first brush seal member; and
a second brush seal member comprising a channel that receives a first tip of a first brush fiber from a plurality of brush fibers extending from a base and a second tip of a second brush fiber of the plurality of brush fibers extending from the base, wherein the channel comprises a tapered portion tapered in a radial direction and configured to compact the first tip and the second tip of the brush fibers together as the brush fibers extend into the channel.

8. The aircraft brush seal of claim 7, wherein the brush fibers are interwoven.

9. The aircraft brush seal of claim 7, wherein the brush fibers are coupled to the first brush seal member.

10. The aircraft brush seal of claim 7, wherein the brush fibers extend into the second brush seal member.

11. The aircraft brush seal of claim 7, wherein the brush fibers extend into a tapered portion of the second brush seal member.

12. The aircraft brush seal of claim 7, wherein the brush fibers do not couple to the second brush seal member.

13. The aircraft brush seal of claim 7, wherein the brush fibers form an air seal.

14. The aircraft brush seal of claim 7, wherein the brush fibers form a seal between a first air compartment and a second air compartment.

15. An aircraft brush seal comprising:
a first brush seal member comprising a first channel that receives a plurality of brush fibers;
a second brush seal member comprising a second channel that receives the plurality of brush fibers; and
a central shaft about which the plurality of brush fibers are wrapped, wherein the plurality of brush fibers are held between the first brush seal member and the second brush seal member by a spring force of the plurality of brush fibers.

16. The aircraft brush seal of claim 15, wherein the plurality of brush fibers wrap about the central shaft to intersect at a junction.

17. The aircraft brush seal of claim 15, wherein the plurality of brush fibers do not couple to the first channel.

18. The aircraft brush seal of claim 15, wherein the plurality of brush fibers do not couple to the second channel.

19. The aircraft brush seal of claim 15, wherein the plurality of brush fibers form a seal between a first air compartment and a secondary air compartment.

* * * * *